(12) United States Patent
Rule et al.

(10) Patent No.: US 10,319,003 B2
(45) Date of Patent: Jun. 11, 2019

(54) SYSTEM AND METHOD FOR UNIFIED DISPUTE RESOLUTION

(75) Inventors: Colin Rule, San Jose, CA (US); Osama Mostafa Bedier, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1072 days.

(21) Appl. No.: 11/643,578

(22) Filed: Dec. 21, 2006

(65) Prior Publication Data

US 2008/0154783 A1   Jun. 26, 2008

(51) Int. Cl.
*G06Q 50/18* (2012.01)
*G06Q 30/04* (2012.01)

(52) U.S. Cl.
CPC ........... *G06Q 30/04* (2013.01); *G06Q 50/188* (2013.01)

(58) Field of Classification Search
CPC ...................................................... G06Q 30/04
USPC .......................................................... 705/1
See application file for complete search history.

(56) References Cited

U.S. PATENT DOCUMENTS

| | | | |
|---|---|---|---|
| 5,878,139 A | 3/1999 | Rosen | |
| 5,895,450 A | 4/1999 | Sloo | |
| 6,330,551 B1 | 12/2001 | Burchetta et al. | |
| 6,535,856 B1 | 3/2003 | Tal | |
| 6,607,389 B2 | 8/2003 | Genevie | |
| 6,766,307 B1 | 7/2004 | Israel et al. | |
| 6,850,918 B1 | 2/2005 | Burchetta et al. | |
| 6,954,741 B1 | 10/2005 | Burchetta et al. | |
| 7,251,607 B1 | 7/2007 | Veschi | |
| 7,343,295 B2 * | 3/2008 | Pomerance ....................... 705/1 |
| 7,630,904 B2 | 12/2009 | Vaidyanathan et al. | |
| 2001/0034635 A1 | 10/2001 | Winters et al. | |
| 2002/0007283 A1 | 1/2002 | Anelli | |
| 2002/0007362 A1 | 1/2002 | Collins et al. | |
| 2002/0010591 A1 | 1/2002 | Pomerance | |
| 2002/0010634 A1 | 1/2002 | Roman et al. | |
| 2002/0035480 A1 | 3/2002 | Gordon et al. | |
| 2002/0147604 A1 | 10/2002 | Slate, II et al. | |
| 2002/0161597 A1 | 10/2002 | Klibaner | |
| 2002/0198830 A1 | 12/2002 | Randell et al. | |
| 2003/0014265 A1 | 1/2003 | Landry et al. | |
| 2003/0018520 A1 | 1/2003 | Rosen | |
| 2003/0187967 A1 | 10/2003 | Walsh et al. | |

(Continued)

FOREIGN PATENT DOCUMENTS

| WO | WO-2006017496 A2 | 2/2006 |
|---|---|---|
| WO | WO-2006017496 A3 | 2/2006 |

OTHER PUBLICATIONS

U.S. Appl. No. 09/583,216, Advisory Action dated Jan. 8, 2009, 3 pgs.

(Continued)

*Primary Examiner* — Dennis W Ruhl
(74) *Attorney, Agent, or Firm* — Maschoff Brennan

(57) ABSTRACT

In an embodiment, a system includes a network-based resolution module. The network-based resolution module is configured to receive information relating to a plurality of disputes relating to transactions involving a common entity. The disputes are associated with two or more payment processing systems. The system further includes a unified interface. The unified interface is associated with the resolution module, and it is configured to provide information relating to disputes that are associated with at least one of the two or more payment processing systems.

24 Claims, 15 Drawing Sheets

| OPEN CHARGEBACKS | 1210A | 1220A | 1230A | 1240A |
|---|---|---|---|---|
| CHARGEBACK DETAILS | | PAYMENT DATE | PAYMENT PROCESSING SYSTEM | RESOLVE |
| USB CD RECORDER - NOT RECEIVED | | 11/1/06 | 1ST NATIONAL BANK | [RESOLVE] |
| WIRELESS MOUSE - NOT AS DESCRIBED | | 11/2/06 | 2ND NATIONAL BANK | [RESOLVE] |
| 256MB SD MEMORY CARD - UNAUTHORIZED | | 11/5/06 | NETWORK-BASED PAYMENT SYSTEM | [RESOLVE] |
| 19" LCD MONITOR - NOT RECEIVED | | 11/9/06 | 3RD NATIONAL BANK | [RESOLVE] |

1200A

(56) References Cited

U.S. PATENT DOCUMENTS

| | | | |
|---|---|---|---|
| 2003/0236679 | A1 | 12/2003 | Galves et al. |
| 2004/0044586 | A1 | 3/2004 | Gullo |
| 2004/0059596 | A1 | 3/2004 | Vaidyanathan et al. |
| 2004/0128155 | A1 | 7/2004 | Vaidyanathan et al. |
| 2004/0128390 | A1 | 7/2004 | Blakley, III et al. |
| 2004/0148234 | A1 | 7/2004 | Gonen-Friedman et al. |
| 2005/0125282 | A1 | 6/2005 | Rosen |
| 2005/0125340 | A1 | 6/2005 | Lin et al. |
| 2005/0246268 | A1 | 11/2005 | Foran et al. |
| 2005/0289039 | A1 | 12/2005 | Greak |
| 2006/0031177 | A1* | 2/2006 | Rule .............................. 705/80 |
| 2007/0294188 | A1 | 12/2007 | Merrill |
| 2008/0154783 | A1 | 6/2008 | Rule et al. |
| 2009/0170604 | A1 | 7/2009 | Mueller et al. |
| 2011/0047008 | A1 | 2/2011 | Rule |

OTHER PUBLICATIONS

U.S. Appl. No. 09/583,216, Advisory Action dated Jan. 14, 2004, 2 pgs.
U.S. Appl. No. 09/583,216, Advisory Action dated Jul. 7, 2005, 4 pgs.
U.S. Appl. No. 09/583,216, Appeal Brief filed Jul. 11, 2005, 20 pgs.
U.S. Appl. No. 09/583,216, Final Office Action dated Mar. 11, 2005, 7 pgs.
U.S. Appl. No. 09/583,216, Final Office Action dated Oct. 3, 2008, 14 pgs.
U.S. Appl. No. 09/583,216, Final Office Action dated Oct. 10, 2003, 14 pgs.
U.S. Appl. No. 09/583,216, Non Final Office Action dated May 6, 2004, 14 pgs.
U.S. Appl. No. 09/583,216, Non-Final Office Action dated Feb. 15, 2008, 12 pgs.
U.S. Appl. No. 09/583,216, Non-Final Office Action dated Apr. 17, 2009, 13 pgs.
U.S. Appl. No. 09/583,216, Preliminary Amendment filed Oct. 31, 2007, 13 pgs.
U.S. Appl. No. 09/583,216, Response filed May 11, 2005 to Final Office Action dated Mar. 11, 2005, 6 pgs.
U.S. Appl. No. 09/583,216, Response filed Jun. 16, 2008 to Non Final Office Action dated Feb. 15, 2008, 11 pgs.
U.S. Appl. No. 09/583,216, Response filed Jul. 14, 2003 to Non Final Office Action dated Apr. 14, 2003, 10 pgs.
U.S. Appl. No. 09/583,216, Response filed Nov. 8, 2004 to Non Final Office Action dated May 6, 2004, 2 pgs.
U.S. Appl. No. 09/583,216, Response filed Dec. 3, 2008 to Final Office Action dated Oct. 3, 2008, 17 pgs.
U.S. Appl. No. 09/711,578, Appeal Brief filed Aug. 3, 2006, 18 pgs.
U.S. Appl. No. 09/711,578, Appeal Brief filed Oct. 27, 2004, 19 pgs.
U.S. Appl. No. 09/711,578, Final Office Action dated Jan. 10, 2006, 8 pgs.
U.S. Appl. No. 09/711,578, Final Office Action dated Apr. 23, 2004, 7 pgs.
U.S. Appl. No. 09/711,578, Non Final Office Action dated Jan. 7, 2005, 7 pgs.
U.S. Appl. No. 09/711,578, Non Final Office Action dated Jul. 15, 2005, 8 pgs.
U.S. Appl. No. 09/711,578, Non Final Office Action dated Sep. 8, 2003, 7 pgs.
U.S. Appl. No. 09/711,578, Response filed Feb. 9, 2004 to Non Final Office Action dated Sep. 8, 2003, 6 pgs.
U.S. Appl. No. 09/711,578, Response filed May 9, 2005 to Non Final Office Action dated Jan. 7, 2005, 7 pgs.
U.S. Appl. No. 09/711,578, Response filed Sep. 23, 2004 to Final Office Action dated Apr. 23, 2004, 5 pgs.
U.S. Appl. No. 09/711,578, Response filed Oct. 17, 2005 to Non Final Office Action dated Jul. 15, 2005, 8 pgs.
U.S. Appl. No. 09/717,433, Advisory Action dated Oct. 16, 2007, 3 pgs.
U.S. Appl. No. 09/717,433, Final Office Action dated May 8, 2007, 7 pgs.
U.S. Appl. No. 09/717,433, Final Office Action dated Sep. 8, 2008, 8 pgs.
U.S. Appl. No. 09/717,433, Final Office Action dated Nov. 18, 2003, 4 pgs.
U.S. Appl. No. 09/717,433, Non Final Office Action dated May 2, 2006, 8 pgs.
U.S. Appl. No. 09/717,433, Non Final Office Action dated May 4, 2005, 4 pgs.
U.S. Appl. No. 09/717,433, Non Final Office Action dated Jun. 3, 2003, 13 pgs.
U.S. Appl. No. 09/717,433, Non Final Office Action dated Oct. 18, 2006, 8 pgs.
U.S. Appl. No. 09/717,433, Non Final Office Action dated Nov. 8, 2004, 4 pgs.
U.S. Appl. No. 09/717,433, Non-Final Office Action dated Feb. 5, 2009, 13 pgs.
U.S. Appl. No. 09/717,433, Non-Final Office Action dated Feb. 6, 2008, 9 pgs.
U.S. Appl. No. 09/717,433, Pre-Appeal Brief Request for Review filed Aug. 8, 2007, 5 pgs.
U.S. Appl. No. 09/717,433, Response filed Jan. 18, 2007 to Non Final Office Action dated Oct. 18, 2006, 7 pgs.
U.S. Appl. No. 09/717,433, Response filed Feb. 8, 2005 to Non Final Office Action dated Nov. 8, 2004, 10 pgs.
U.S. Appl. No. 09/717,433, Response filed Jun. 3, 2009 to Non Final Office Action dated Feb. 5, 2009, 17 pgs.
U.S. Appl. No. 09/717,433, Response filed Jun. 5, 2008 to Non-Final Office Action dated Feb. 6, 2008, 13 pgs.
U.S. Appl. No. 09/717,433, Response filed Jul. 9, 2007 to Final Office Action dated May 8, 2007, 7 pgs.
U.S. Appl. No. 09/717,433, Response filed Aug. 1, 2005 to Non Final Office Action dated May 4, 2005, 4 pgs.
U.S. Appl. No. 09/717,433, Response filed Aug. 2, 2006 to Non Final Office Action dated May 2, 2006, 11 pgs.
U.S. Appl. No. 09/717,433, Response filed Sep. 2, 2003 to Non Final Office Action dated Jun. 3, 2003, 11 pgs.
U.S. Appl. No. 09/717,433, Response filed Nov. 5, 2007 to Final Office Action dated May 8, 2007, 14 pgs.
U.S. Appl. No. 09/717,433, Response filed Nov. 10, 2008 to Final Office Action dated Sep. 8, 2008, 17 pgs.
U.S. Appl. No. 10/837,224, Advisory Action dated May 28, 2009, 3 pgs.
U.S. Appl. No. 10/837,224, Final Office Action dated Feb. 4, 2009, 12 pgs.
U.S. Appl. No. 10/837,224, Non-Final Office Action dated Jan. 10, 2008, 7 pgs.
U.S. Appl. No. 10/837,224, Response filed May 12, 2008 to Non-Final Office Action dated Jan. 10, 2008, 18 pgs.
U.S. Appl. No. 10/837,224, Response filed Jun. 4, 2009 to Final Office Action dated Feb. 4, 2009, 13 pgs.
U.S. Appl. No. 10/837,224, Response filed Apr. 6, 2009 to Final Office Action dated Feb. 4, 2009, 13 pgs.
U.S. Appl. No. 11/004,699, Appeal Brief filed Jan. 17, 2007, 23 pgs.
U.S. Appl. No. 11/004,699, Final Office Action dated Jul. 14, 2006, 7 pgs.
U.S. Appl. No. 11/004,699, Non Final Office Action dated Jan. 20, 2006, 6 pgs.
U.S. Appl. No. 11/004,699, Non Final Office Action dated Aug. 5, 2005, 6 pgs.
U.S. Appl. No. 11/004,699, Pre-Appeal Brief Request for Review filed Sep. 14, 2006, 4 pgs.
U.S. Appl. No. 11/004,699, Preliminary Amendment filed Dec. 3, 2004, 14 pgs.
U.S. Appl. No. 11/004,699, Response filed Apr. 20, 2006 to Non Final Office Action dated Jan. 20, 2006, 15 pgs.
U.S. Appl. No. 11/004,699, Response filed Nov. 7, 2005 to Non Final Office Action dated Aug. 5, 2005, 14 pgs.
U.S. Appl. No. 11/195,578, Non-Final Office Action dated May 28, 2009, 23 pgs.
"EBay Website", Existed on Oct. 14, 1999 Retrieved From the Way Back Machine, 1-31.

(56) References Cited

OTHER PUBLICATIONS

"EBay: The Feedback Forum", www.archive.org:, (Oct. 12, 1999), 4 pgs.

European Application Serial No. 05777559.5, Extended European Search Report dated Mar. 23, 2009, 6 pgs.

European Application Serial No. 05777559.5, Office Action dated Jul. 15, 2009, 1 pg.

International Search Report, Application No. PCT/US04/17641, dated Mar. 28, 2005, 10 Pages.

"Square Trade's online dispute resolution process, step by step", Square Trade website.www.squaretrade.com from www.archive.org, (May 10, 2000).

"UAUTOBID.com, Inc. Introduces the Capabilty to Purchase Specific Vechicles Online", *Business Wire*, (Sep. 13, 1999), 1.

Baumann, G. W, "Personal Optimized Decision/Transaction Program", *IBM Technical Disclosure Bulletin*,. (Jan. 1995), 83-84.

Rule, Colin, "Online Dispute Resolution for Business—B2B, E-Commerce, Consumer, Employment, Insurance, and Other Commercial Conflicts", *Online Dispute Resolution for Business, Jossey-Bass, A Wiley Imprint*, (2002), 1-326.

U.S. Appl. No. 11/195,578, Final Office Action dated Jan. 20, 2010, 30 pgs.

U.S. Appl. No. 11/195,578, Response filed Sep. 28, 2009 to Non Final Office Action dated May 28, 2009, 21 pgs.

"U.S. Appl. No. 11/195,578, Response filed Mar. 22, 2010 to Final Office Action dated Jan. 20, 2010", 16 pgs.

"U.S. Appl. No. 11/195,578 Non-Final Office Action dated Sep. 2, 2010", 29 pgs.

"U.S. Appl. No. 11/195,578, Advisory Action dated Apr. 8, 2010", 4 pgs.

"U.S. Appl. No. 11/195,578, Appeal Brief filed Jun. 18, 2010", 28 pgs.

"U.S. Appl. No. 11/195,578, Response filed Dec. 2, 2010 to Non Final Office Action dated Sep. 2, 2010", 13 pgs.

"U.S. Appl. No. 12/544,927, Non Final Office Action dated Jan. 25, 2011", 15 pgs.

"Be A Juror", iCourthouse, www.i-courthouse.com, (2003), 1.

"U.S. Appl. No. 11/195,578, Examiner Interview Summary dated Sep. 8, 2014", 6 pgs.

"U.S. Appl. No. 11/195,578, Final Office Action dated May 1, 2015", 65 pgs.

"U.S. Appl. No. 11/195,578, Non Final Office Action dated Aug. 6, 2014", 47 pgs.

"U.S. Appl. No. 11/195,578, Non Final Office Action dated Dec. 19, 2013", 40 pgs.

"U.S. Appl. No. 11/195,578, Response filed Jan. 6, 2015 to Non Final Office Action dated Aug. 6, 2014", 11 pgs.

"U.S. Appl. No. 11/195,578, Response filed Apr. 21, 2014 to Non Final Office Action dated Dec. 19, 2013", 10 pgs.

"U.S. Appl. No. 12/544,927, Final Office Action dated Apr. 2, 2013", 18 pgs.

"U.S. Appl. No. 12/544,927, Final Office Action dated May 12, 2015", 35 pgs.

"U.S. Appl. No. 12/544,927, Final Office Action dated Jul. 13, 2011", 19 pgs.

"U.S. Appl. No. 12/544,927, Non Final Office Action dated Aug. 12, 2014", 21 pgs.

"U.S. Appl. No. 12/544,927, Non Final Office Action dated Oct. 12, 2012", 18 pgs.

"U.S. Appl. No. 12/544,927, Non Final Office Action dated Dec. 26, 2013", 21 pgs.

"U.S. Appl. No. 12/544,927, Response filed Feb. 12, 2013 to Non Final Office Action dated Oct. 12, 2012", 12 pgs.

"U.S. Appl. No. 12/544,927, Response filed Apr. 28, 2014 to Non Final Office Action dated Dec. 26, 2013", 14 pgs.

"U.S. Appl. No. 12/544,927, Response filed Jul. 2, 2013 to Final Office Action dated Apr. 2, 2013", 13 pgs.

"U.S. Appl. No. 12/544,927, Response filed Sep. 9, 2011 to Final Office Action dated Jul. 13, 2011", 12 pgs.

"U.S. Appl. No. 12/544,927, Response filed Dec. 12, 2014 to Non Final Office Action dated Aug. 12, 2014", 19 pgs.

"U.S. Appl. No. 12/544,943, Final Office Action dated Mar. 19, 2015", 29 pgs.

"U.S. Appl. No. 12/544,943, Final Office Action dated Apr. 11, 2012", 27 pgs.

"U.S. Appl. No. 12/544,943, Final Office Action dated Oct. 17, 2013", 26 pgs.

"U.S. Appl. No. 12/544,943, Non Final Office Action dated Jan. 25, 2013", 31 pgs.

"U.S. Appl. No. 12/544,943, Non Final Office Action dated Mar. 13, 2014", 21 pgs.

"U.S. Appl. No. 12/544,943, Non Final Office Action dated May 24, 2013", 32 pgs.

"U.S. Appl. No. 12/544,943, Non Final Office Action dated Aug. 16, 2012", 31 pgs.

"U.S. Appl. No. 12/544,943, Non Final Office Action dated Aug. 28, 2014", 27 pgs.

"U.S. Appl. No. 12/544,943, Non Final Office Action dated Nov. 21, 2011", 25 pgs.

"U.S. Appl. No. 12/544,943, Response filed Jan. 17, 2014 to Final Office Action dated Oct. 17, 2013", 13 pgs.

"U.S. Appl. No. 12/544,943, Response filed Feb. 20, 2012 to Non Final Office Action dated Nov. 21, 2011", 10 pgs.

"U.S. Appl. No. 12/544,943, Response filed Apr. 24, 2013 to Non Final Office Action dated Jan. 25, 2013", 11 pgs.

"U.S. Appl. No. 12/544,943, Response filed Jun. 13, 2014 to Non Final Office Action dated Mar. 13, 2014", 13 pgs.

"U.S. Appl. No. 12/544,943, Response filed Jun. 19, 2015 to Final Office Action dated Mar. 19, 2015", 22 pgs.

"U.S. Appl. No. 12/544,943, Response filed Jul. 11, 2012 to Final Office Action dated Apr. 11, 2012", 10 pgs.

"U.S. Appl. No. 12/544,943, Response filed Aug. 15, 2013 to Non Final Office Action dated May 24, 2013", 12 pgs.

"U.S. Appl. No. 12/544,943, Response filed Nov. 16, 2012 to Non Final Office Action dated Aug. 16, 2012", 11 pgs.

"U.S. Appl. No. 12/544,943, Response filed Dec. 29, 2014 to Non Final Office Action dated Aug. 28, 2014", 19 pgs.

"International Application Serial No. PCT/US2005/027407, International Preliminary Report on Patentability dated Feb. 15, 2007", 6 pgs.

"International Application Serial No. PCT/US2005/027407, International Search Report and Written Opinion dated Apr. 14, 2006", 12 pgs.

"JAMS Guide to Dispute Resolution for Commercial Contracts", [Online]. Retrieved from the Internet:<:http://www.jamsadr.com/rules/clauses.asp, (Revised Aug. 2006), 3 pgs.

"Skill Based Pay Law & Legal Definition", http://definitions.uslegal.com/s/skill-based-pay, (Apr. 8, 2008), 3 pgs.

U.S. Appl. No. 11/195,578, filed Aug. 2, 2005, Method and System to Design a Dispute Resolution Process.

U.S. Appl. No. 12/544,927, filed Aug. 20, 2009, System and Method for Community-Based Dispute Resolution.

U.S. Appl. No. 12/544,943, filed Aug. 20, 2009, System and Method for Fee Determination in a Community-Based Dispute Resolution.

* cited by examiner

| OPEN CHARGEBACKS | 1210A | 1220A | 1230A | 1240A |
|---|---|---|---|---|
| CHARGEBACK DETAILS | | PAYMENT DATE | PAYMENT PROCESSING SYSTEM | RESOLVE |
| USB CD RECORDER – NOT RECEIVED | | 11/1/06 | 1ST NATIONAL BANK | [RESOLVE] |
| WIRELESS MOUSE – NOT AS DESCRIBED | | 11/2/06 | 2ND NATIONAL BANK | [RESOLVE] |
| 256MB SD MEMORY CARD – UNAUTHORIZED | | 11/5/06 | NETWORK-BASED PAYMENT SYSTEM | [RESOLVE] |
| 19" LCD MONITOR – NOT RECEIVED | | 11/9/06 | 3RD NATIONAL BANK | [RESOLVE] |

*FIG. 12A*

| CLOSED CHARGEBACKS | 1210B | 1220B | 1230B | 1240B |
|---|---|---|---|---|
| CHARGEBACK DETAILS | | PAYMENT DATE | PAYMENT PROCESSING SYSTEM | OUTCOME |
| 1250B  WACOM GRAPHICS TABLET – NOT AS DESCRIBED | | 10/27/06 | 1ST NATIONAL BANK | AUTO – REFUNDED |
| 1255B  LOGITECH WEBCAM – NOT RECEIVED | | 10/29/06 | 2ND NATIONAL BANK | DISPUTED |
| 1260B  1GIG SANDISK USB MEMORY STICK – UNAUTHORIZED | | 11/1/06 | 3RD NATIONAL BANK | REFUNDED |
| 1265B  3.5" EXTERNAL HARD DRIVE CASE – UNAUTHORIZED | | 11/3/06 | NETWORK-BASED PAYMENT SYSTEM | LIABILITY ACCEPTED |

*FIG. 12B*

SYSTEM AND METHOD FOR UNIFIED DISPUTE RESOLUTION

RELATED APPLICATIONS

This application is related to U.S. patent application Ser. No. 11/195,578, filed Aug. 2, 2005, and entitled Method and System to Design a Dispute Resolution Process. The content of the aforementioned application is incorporated herein by reference.

TECHNICAL FIELD

The present application relates generally to the technical field of automated dispute resolution and, in one example, to a system and method to provide a unified interface to aggregate a plurality of disputes from two or more payment processing systems.

BACKGROUND

Commercial entities, such as buyers and sellers that enter into transactions involving goods and services in a network-based commerce system, sometimes disagree about the transactions. To resolve these disputes, one or more of the commercial entities may request the services of an online dispute resolution provider. Indeed, the party that requests the services, the complainant, may be unaware of the plurality of entities that may be involved in the ultimate settlement of such a dispute. As a result, the settlement of such disputes is very time consuming for all the parties involved.

BRIEF DESCRIPTION OF THE DRAWINGS

The present invention is illustrated by way of example and not limitation in the figures of the accompanying drawings, in which like reference characters indicate similar elements and in which:

FIG. 12A is a user interface to report open chargebacks in a dispute resolution system, according to an example embodiment;

FIG. 12B is a user interface to report closed chargebacks in a dispute resolution system, according to an example embodiment;

DETAILED DESCRIPTION

A system and method for a unified dispute resolution process are described. In the following description, for purposes of explanation, numerous specific details are set forth in order to provide a thorough understanding of the present disclosure. It will be evident, however, to one skilled in the art, that the present disclosure may be practiced without these specific details.

According to an aspect of the present disclosure, there is provided a system and method to provide an aggregation of disputes in a network-based commerce system. A network-based resolution module is configured to receive a plurality of disputes relating to transactions involving a common entity. The common entity may be a seller, a buyer, or some other commercial entity. The disputes may be associated with two or more payment processing systems. The system and method further provides a unified interface associated with the resolution module. The unified interface is configured to provide information relating to disputes associated with at least one of the two or more payment processing systems. The system and method may be implemented via instructions on a machine readable medium.

Such a dispute resolution system in a network-based commerce environment provides several benefits to participants in the network-based commerce environment. For example, for sellers and other merchants who have relationships with several merchant banks or other payment processing systems, the seller will not have to access a separate system, with different processes and interfaces, to settle disputes for each payment processing system. Rather, the present disclosure provides a system in which the seller can address all disputes in a single interface. Additionally, the present disclosure permits a seller to create dispute resolution rules, such as having the system automatically settle all disputes that relate to transactions that are less than a certain dollar amount. In this manner, the seller does not have to spend his time working on such disputes.

Figure 1:
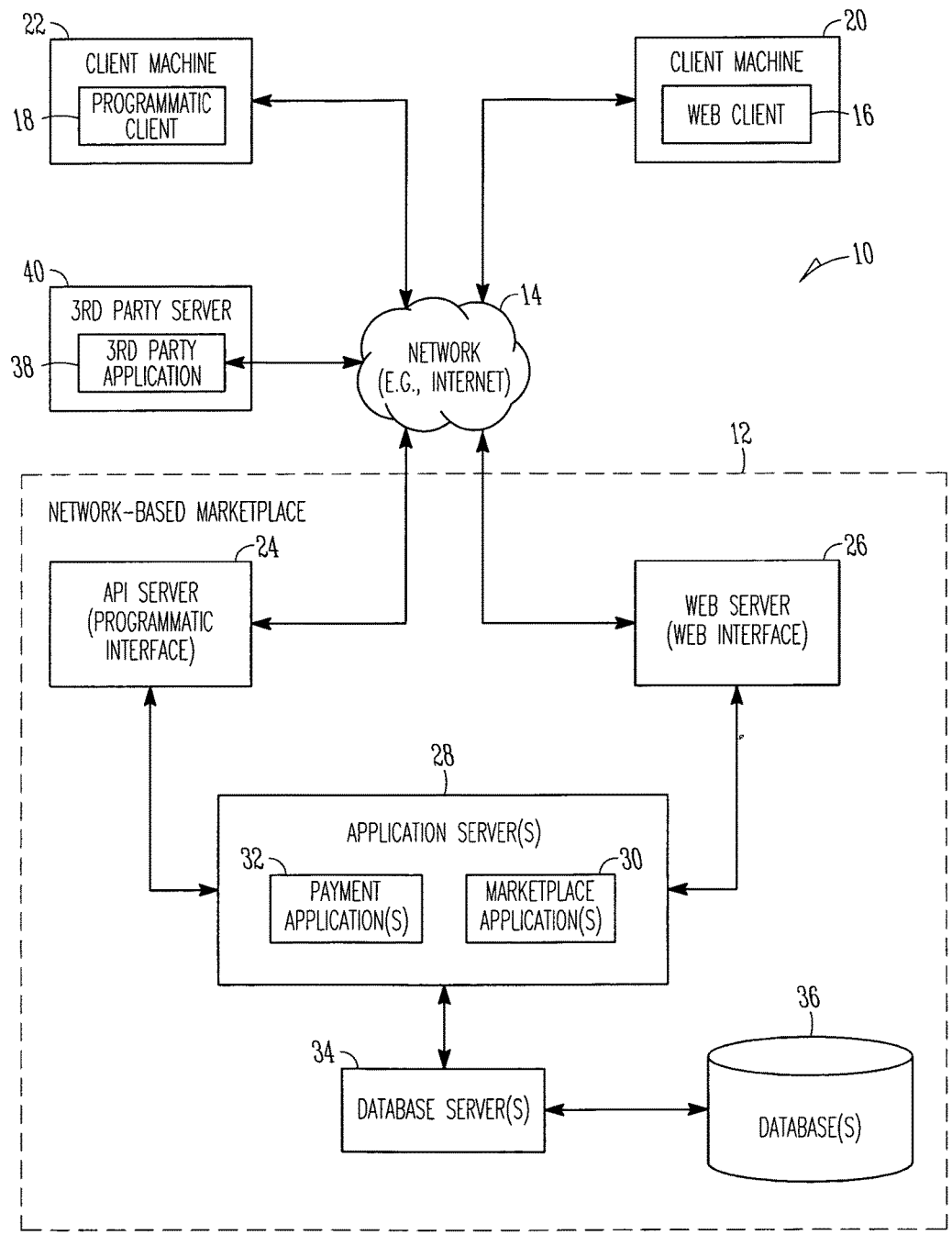
FIG. 1 is a network diagram depicting a system, according to an example embodiment.

FIG. 1 is a network diagram depicting a system 10, according to an example embodiment of the present disclosure, having a client-server architecture. A commerce platform, in the example form of a network-based marketplace 12, provides server-side functionality, via a network 14 (e.g., the Internet) to one or more clients. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. In addition, the payment applications may include component processes that may be utilized to settle disputes between users (e.g., auction winners/buyers and sellers) that have transacted items (e.g., goods and services). While the marketplace and payment applications 30 and 32 are shown in FIG. 1 to both form part of the network-based marketplace 12, it will be appreciated that, in alternative embodiments of the present disclosure, the payment applications 32 may form part of a payment service that is separate and distinct from the marketplace 12.

Further, while the system 10 shown in FIG. 1 employs a client-server architecture, the present disclosure is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12 or component processes that may be utilized to settle disputes between users (e.g., auction winners/buyers and sellers) that have transacted items on the network based marketplace 12.

Marketplace Applications

Figure 2:
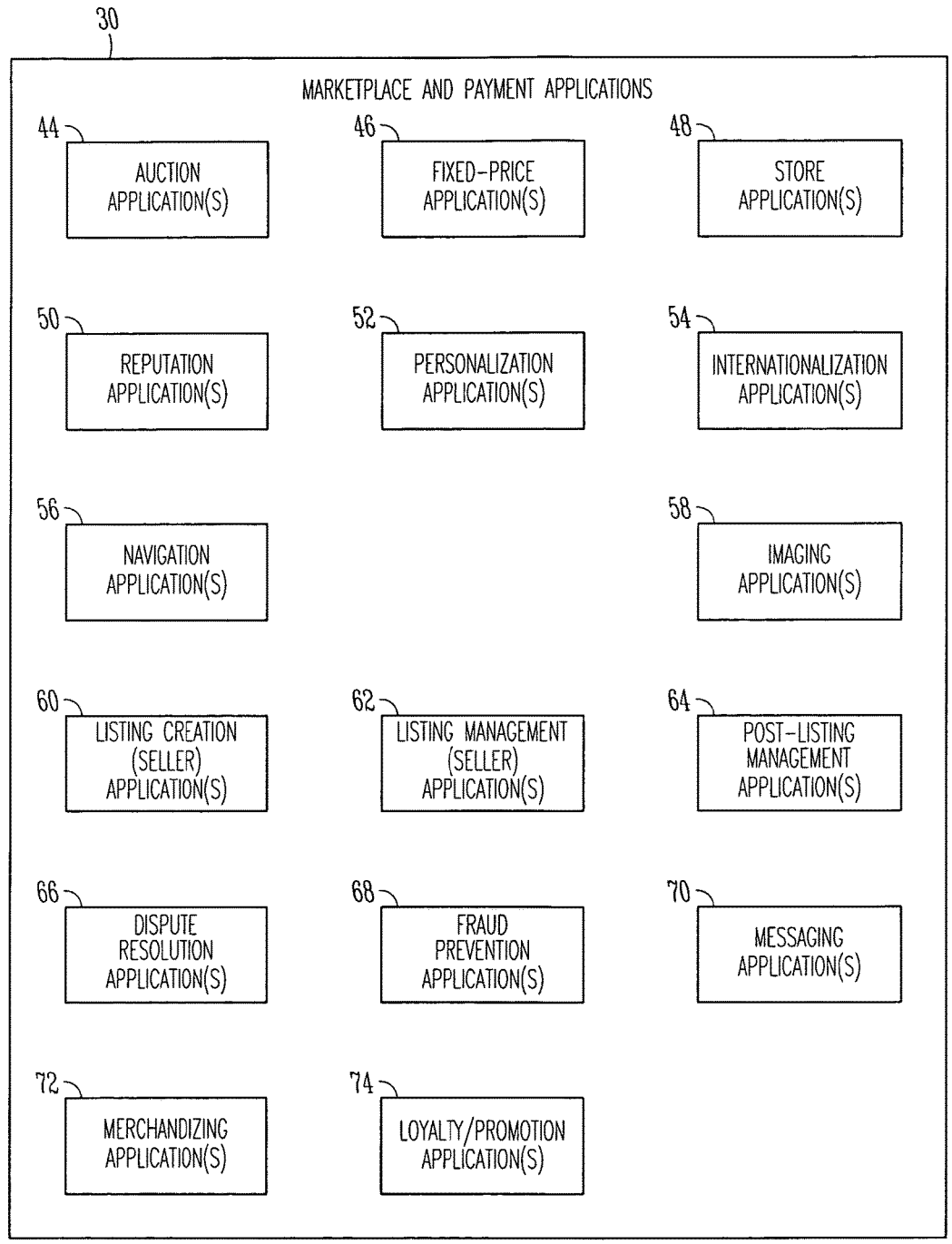
FIG. 2 is a block diagram illustrating multiple marketplace and payment applications, according to an example embodiment.

FIG. 2 is a block diagram illustrating multiple marketplace and payment applications 30 that, in an example embodiment of the present disclosure, are provided as part of the network-based marketplace 12. The marketplace 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace and payment applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact business utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness. In an example embodiment a single feedback may include comment and a score (e.g., −1 to register negative feedback, 0 to register neutral feedback, and +1 to register positive feedback). Further, scores may be analyzed to generate a feedback rating that is associated with a user. Other users in the network-based marketplace may access the feedback rating to assess the reputation of the user.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In an example embodiment, internationalization applications 54 may support a number of marketplaces that are customized, for example, for specific geographic regions. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network-based marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the marketplace 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide processes (e.g., dispute resolution wizard, component processes, a document management application, etc.) whereby the parties are automatically guided through a number of steps in an attempt to settle a dispute. The dispute may be settled by a third party provider. As disclosed in further detail later on in the disclosure, a third party may also provide a means to aggregate disputes from a plurality of payment processing systems into a unified interface.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 3:
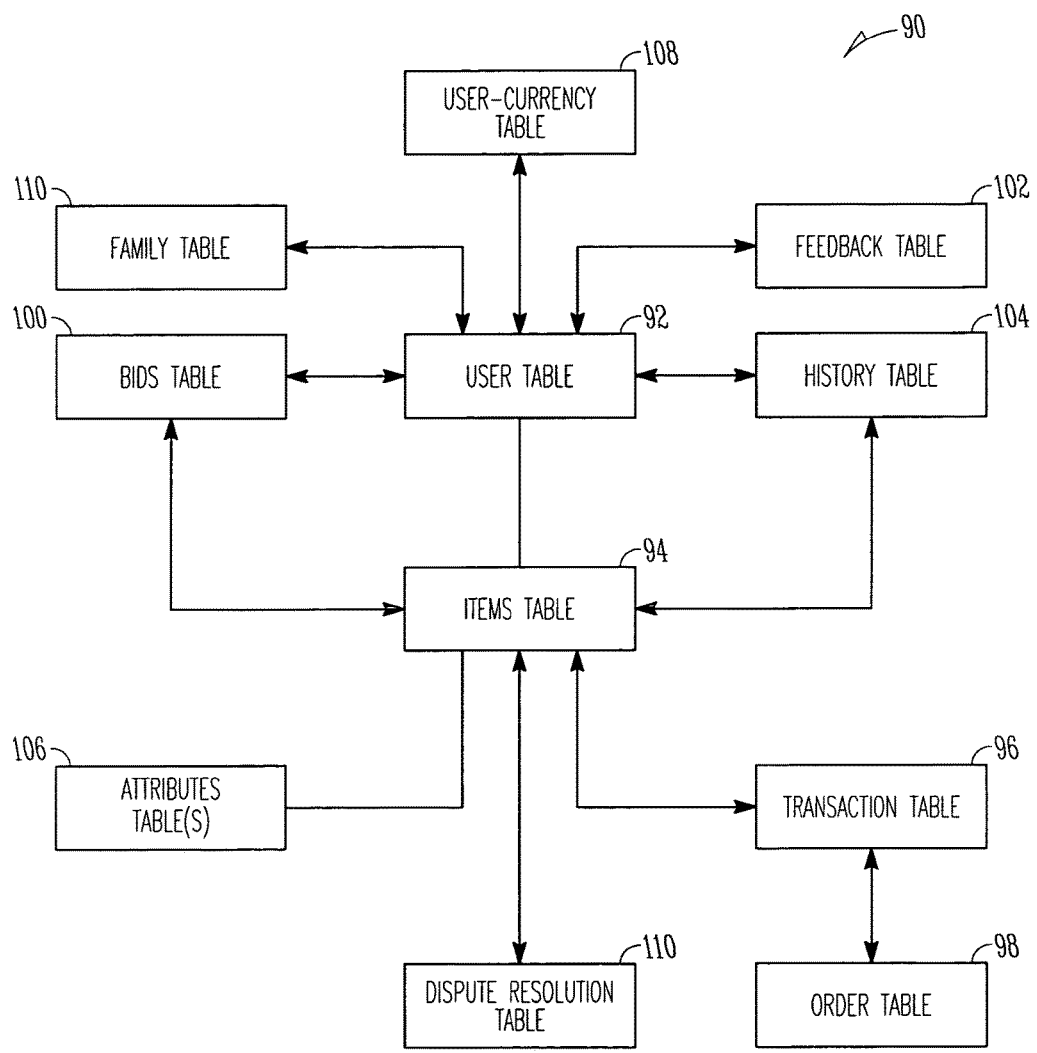
FIG. 3 is a block diagram illustrating database tables, according to an example embodiment.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In an example embodiment of the present disclosure, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in an example embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute table 108 identifying the currency of a price for the relevant item as specified in by a seller. A dispute resolution table 110 may store dispute information that may be utilized to characterize disputes along with various other information regarding disputes.

Figure 4:
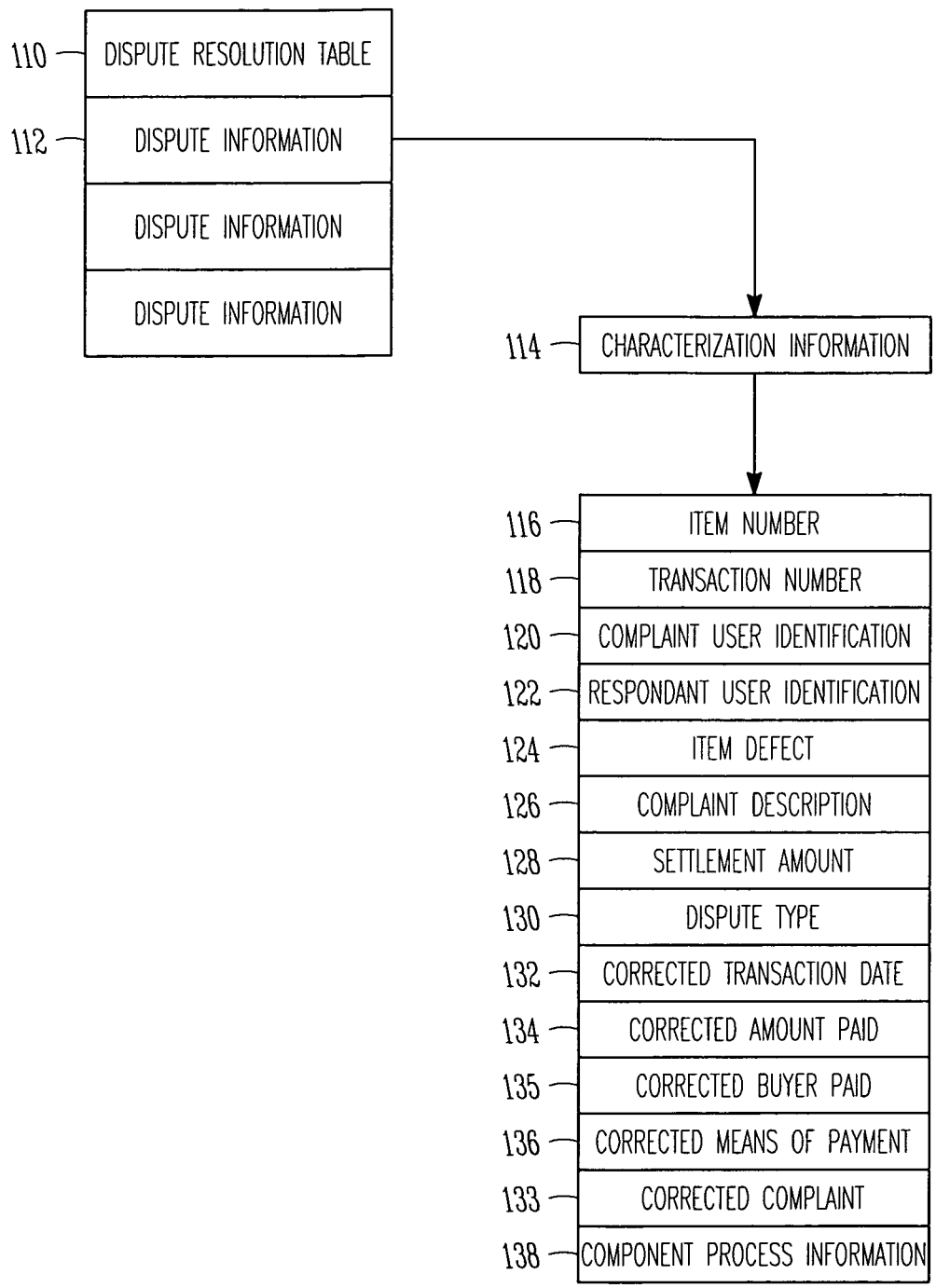
FIG. 4 is a block diagram illustrating a dispute resolution table, according to an example embodiment.

FIG. 4 is a block diagram illustrating the dispute resolution table 110, according to an example embodiment. The dispute resolution table 110 is shown to include multiple entries identified as dispute information 112. Each dispute information 112 may be associated to a dispute that is tracked by the network based marketplace 12. The dispute information 112 includes characterization information 114 that is utilized to characterize the dispute. The characterization information 114 includes an item number 116, a transaction number 118, a complainant user identification 120, a respondent user identification 122, an item defect (e.g., description of defected item) 124, a complaint description 126, a settlement amount 128, and a dispute type 130. In addition, the characterization information 114 is shown to include information that the user may have corrected including a corrected transaction date 132, a corrected amount paid 134, a corrected buyer paid 135, a corrected means of payment 136, and a corrected complainant 133. Finally, the characterization information 114 includes component process information 138. The item number 116 identifies an item that is associated with the dispute. The item number 116 may be utilized to access additional item information in the items table 94. The transaction number 118 identifies a transaction that is associated with the dispute. The transaction number 118 may be utilized to access additional transaction information in the transaction table 96. The complainant user identification 120 may be utilized to identify the complainant (e.g., that party that initially submits a complaint or dispute) which may be a user (e.g., buyer, seller, etc.) in the network-based marketplace 12. The complainant user identification 120 may be utilized to access additional user information in the user table 92. The respondent user identification 122 may be utilized to uniquely identify the respondent (e.g., responds to complaint) and to access additional user information in the user table 92. The item defect 124 may be a description of a defect of an item (e.g., text, slides, graph, photo, etc.). The complaint description 126 may be a description of the complaint entered by the complainant. The settlement amount 128 may be an amount of currency for which the complainant is willing to settle the dispute. The corrected transaction date 132 may be entered by the user to correct a transaction date retrieved by the network-based marketplace 12. The corrected amount paid 134 may be entered by the user to correct an amount paid retrieved by the network-based marketplace 12. The corrected buyer paid 135 may be entered by the buyer to correct a buyer paid flag (e.g., asserted if buyer has already paid) retrieved by the network-based marketplace 12. The corrected means of payment 136 may be entered by the buyer to correct a means of payment indication (e.g., visa credit card, check, etc.) retrieved by the network-based marketplace 12. The component process information 138 included information regarding component processes such as component processes 192 in FIG. 8.

Figure 5:
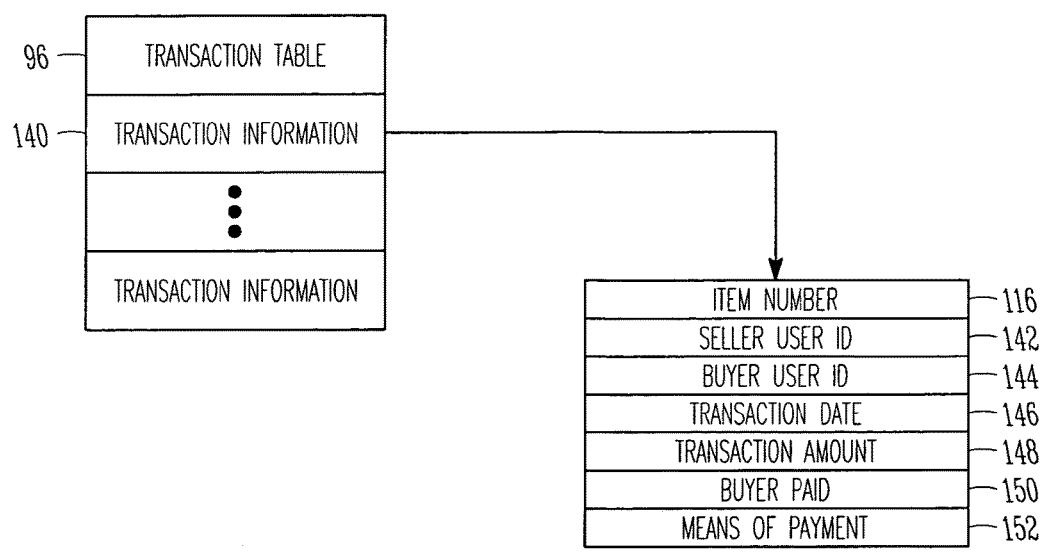
FIG. 5 is a block diagram illustrating a transaction table, according to an example embodiment.

FIG. 5 is a block diagram illustrating a transaction table 96, according to an example embodiment. The transaction table 96 includes multiple entries of transaction information 140. Each transaction information 140 entry is associated with a transaction in the network-based marketplace 12 and may include an item number 116, as previously described, seller user identification 142, buyer user identification 144, a transaction date 146, a transaction amount 148, buyer paid 150, and a means of payment 152. The seller user identification 142 may be utilized to identify the seller associated with the transaction. The seller user identification 142 may be utilized to access additional user information in the user table 92. The buyer user identification 144 may be utilized to identify the buyer associated with the transaction which may be a user in the network-based marketplace 12. The buyer user identification 144 may be utilized to access additional user information in the user table 92. The transaction date 146 may be the date the transaction was completed (e.g., date buyer agrees to pay or date an auction closes or date the buyer or bidder has placed the winning bid, etc.). The transaction amount 148 may be the amount of currency (e.g., US Dollars, English pounds, proprietary currency, etc.) agreed to be exchanged for the associated item (e.g., good or service) identified by the item number 116. The buyer paid 150 may be a buyer provided indication of whether the buyer has paid. The means of payment 152 may indicate the means of payment by the buyer (e.g., cash, check, visa credit card, payment service, etc.).

Figure 6:
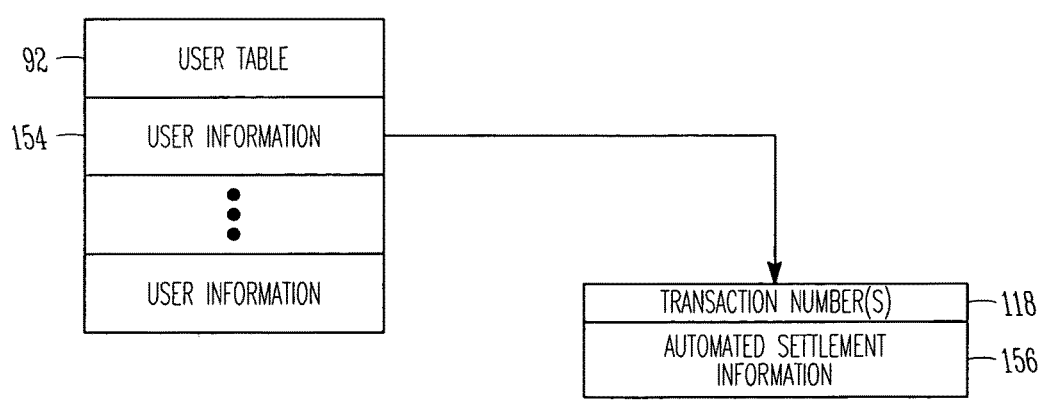
FIG. 6 is a block diagram illustrating a user table, according to an example embodiment.

FIG. 6 is a block diagram illustrating a user table 92, according to an example embodiment. The user table 92 is shown to include multiple user information 154 entries. Each user information 154 entry is associated with a user (e.g., buyer/bidder, seller) that utilizes the network-based marketplace 12. The user information 154 entry is shown to include one or more transaction numbers 118, previously described, and automated settlement information 156. The automated settlement information 156 may be seller provided settlement information (e.g., monetary amounts) that may be automatically utilized by a monetary settlement component process to settle disputes. For example, a seller that transacts high volumes of a particular item may not be interested in becoming personally involved with a dispute that may be settled below a certain monetary value. In such instances, the seller may automatically provide offers in the form of monetary amounts that may be utilized by a monetary component process that compares demands (e.g. from the seller) with offers (e.g., from the buyer), typically in three rounds, to arrive at a settlement.

Figure 7:
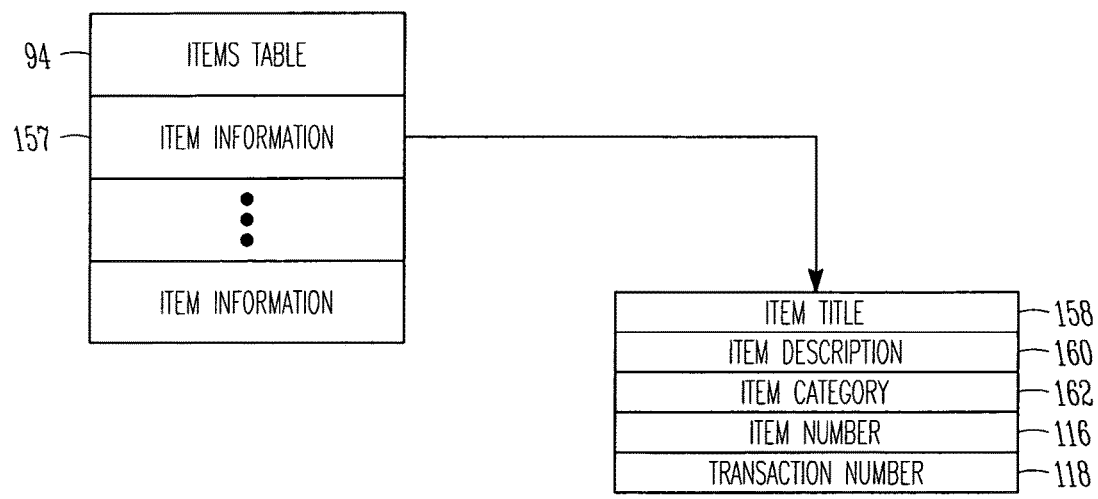
FIG. 7 is a block diagram illustrating an item table, according to an example embodiment.

FIG. 7 is a block diagram illustrating an items table 94, according to an example embodiment. The items table 94 is shown to include multiple item information 157 entries. Each item information 157 entry is associated with an item listing (e.g., describing goods or services) that is utilized to present the item on the network-based marketplace 12. The item information 157 entry is shown to include an item title 158, an item description 160, an item category 162, an item number 116, as previously described, and a transaction number 118, as previously described. The item title 158, item description 160, and item category 162 are entered by the seller. In some embodiments more than a single item category 162 may be entered (e.g., snorkeling gear, swimming, recreation, sporting goods, etc.) for the same item. The item description may include text, graphics, and photographs.

Figure 8:
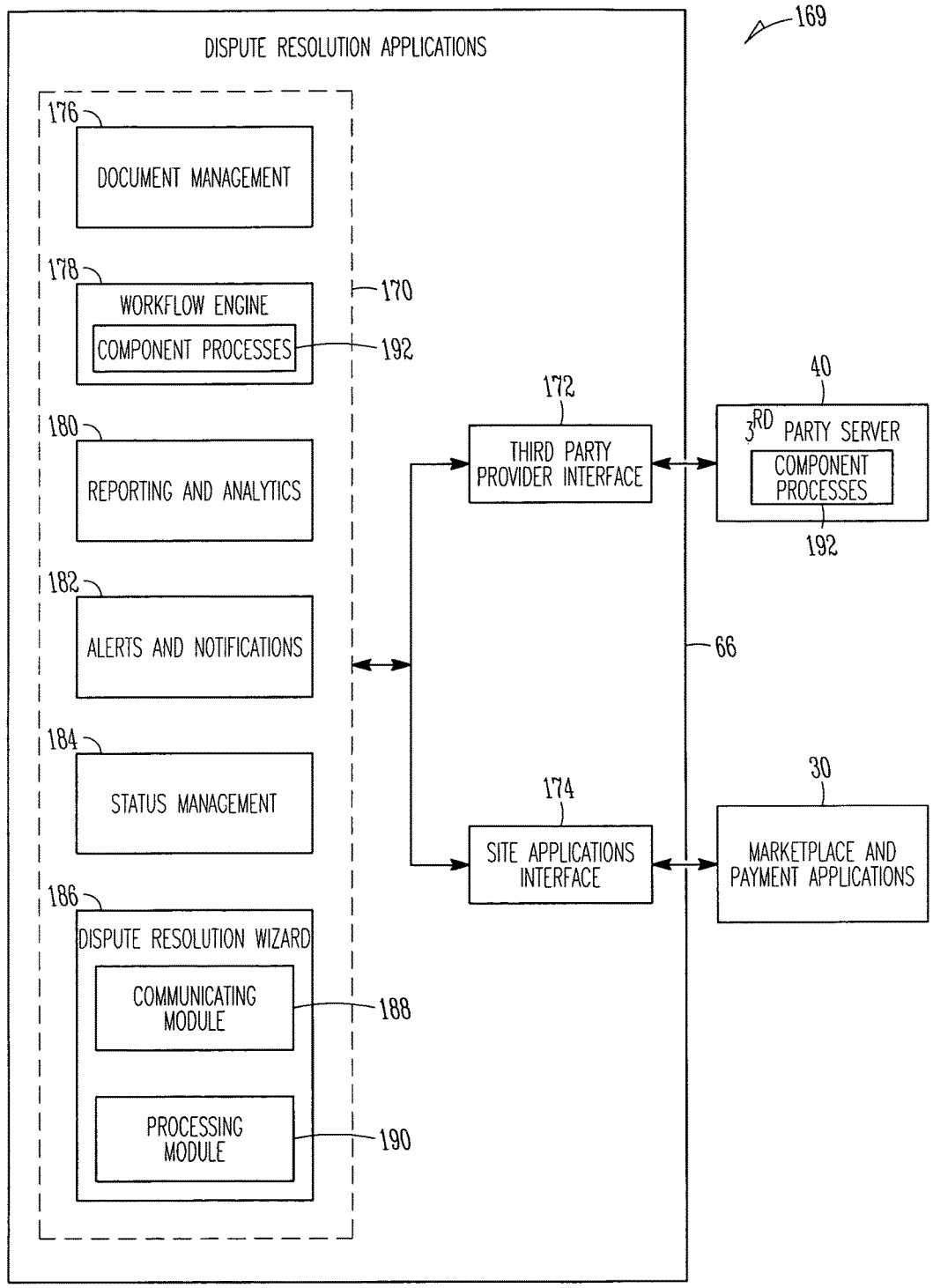
FIG. 8 is a block diagram illustrating dispute resolution applications, according to an example embodiment.

FIG. 8 is a block diagram illustrating a dispute resolution system 169, according to an example embodiment. The dispute resolution system 169 is shown to include dispute resolution applications 66, a third party server 40 and marketplace and payment applications 30. The dispute resolution applications 66 include dispute resolution core applications 170, a third party provider interface 172, and a site application interface 174. The dispute resolution applications 66 are shown to communicate via the third party provider interface 172 with the $3^{rd}$ party server 40 that may execute component processes 192 and via the site applications interface 174 with marketplace and payment applications 30. The dispute resolution core applications 170 include a document management application 176, a workflow engine 178, a reporting and analytics application 180, an alerts and notifications application 182, a status management application 184, and a dispute resolution wizard 186. The document management application 176 may provide services to enable users and processes to upload or send in documents and other types of electronic assets (e.g., any type of digital media that is stored electronically) to support resolution processes. The workflow engine 178 represents disputes and executes component processes 192 in response to events (e.g., system timeouts, user actions including filing a complaint and other actions, etc.). Component process 192 may be discrete mechanisms to settle a dispute and may be completely or partially automated. Multiple component processes 192 may be selected by a complainant to settle a single dispute and a single component process 192 is usually associated with published procedures and time tables for completing tasks that contribute towards the resolution of a dispute. A completed component process 192 may or may not result in the settlement of a dispute. The component processes 192 may be provided by an internal provider (e.g., executing on the network-based marketplace 12, payment service, etc.) or an external provider (e.g., executing on the third party server 40 including a dispute resolution provider, payment service, etc.). The reporting and analytics application 180 provides users and administrators with reports including analysis pertaining to the processing of disputes, categories of disputes, status of disputes, and other dispute related processing. The reporting and analytics application 180 may also trigger alerts to external systems via the third party provider interface 172 and the site applications interface 174. The alerts and notifications application 182 communicate events and rules bases status notifications (e.g., emails, action alerts, pop ups, etc.) to the users (e.g., buyers/bidders, sellers). The status management application 184 may be used to provide users with a single area online for filing, checking on, and resolving all types of disputes and/or issues.

The dispute resolution wizard 186 enables a complainant to design a dispute resolution process from multiple component processes 192. The dispute resolution wizard 186 is shown to include a communicating module 188 and a processing module 190. The communicating module 188 receives information from a complainant that may be used to characterize the dispute and to access information in a database 36 that may be used to characterize the dispute. The processing module 190 may be used to determine if the characterized dispute is appropriate to settle with component processes 192, identify one or more component processes 192 to settle the dispute, and communicate user interfaces to the complainant that enable the complainant to select component processes 192 and their order of execution thereby designing a dispute resolution process.

Figure 9:
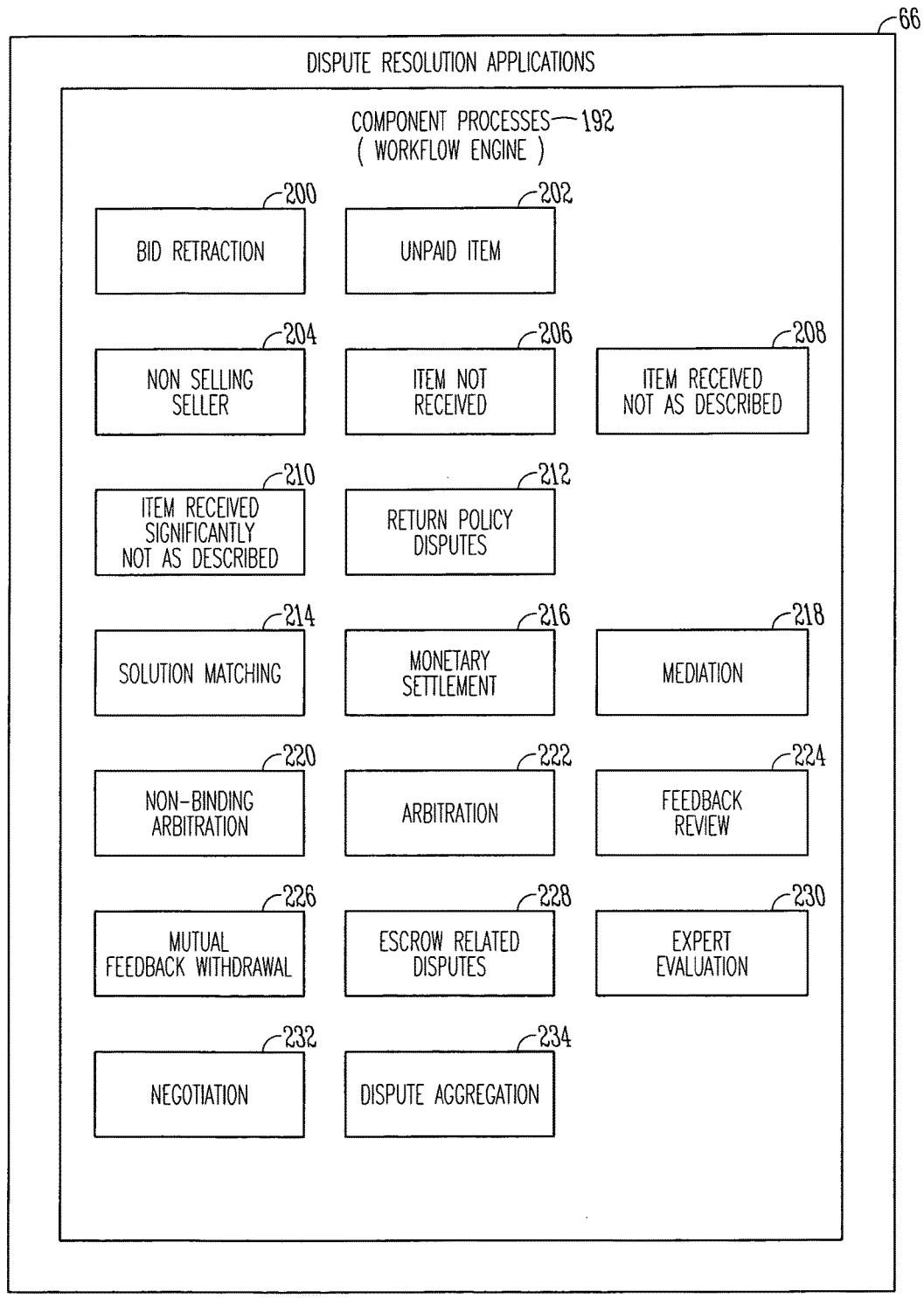
FIG. 9 is a block diagram illustrating component processes, according to an example embodiment.

FIG. 9 is a block diagram illustrating component processes 192, according to an example embodiment. The component processes 192 include a bid retraction component process 200, an unpaid item component process 202, a non-selling seller component process 204, an item not received component process 206, an item received not as described component process 208, an item received significantly not as described component process 210, a return policy disputes component process 212, a solution matching component process 214, a monetary settlement component process 216, a mediation component process 218, a non-binding arbitration component process 220, an arbitration component process 222, a feedback review component process 224, a mutual feedback withdrawal component process 226, an escrow related disputes component process, an expert evaluation component process 230, a negotiation component process 232, and a dispute aggregation process 234.

Seller Initiated Complaints

The bid retraction component process 200 is an automated dispute resolution process that may be initiated by a seller complainant in response to a bidder that enters a bid into an auction and retracts the bid just prior to the close of the auction. Indeed, the bidder may be a competitor that is attempting to keep other bidders out by entering a high bid that discourages other bidding.

The unpaid item component process 201 is an automated dispute resolution process that may be initiated by a seller complainant in response to a buyer that has agreed to the terms of a transaction (e.g., auction, sale, etc.) but may not have, subsequent to close of the transaction, sent payment, responded to e-mail or responded to telephone correspondence initiated by the seller.

Buyer Initiated Complaints

The non-selling seller component process 204 is an automated dispute resolution process that may be initiated by a buyer complainant in response to a seller that refuses deliver an item (e.g., good or service) after the buyer and seller have completed the transaction.

The item not received component process 206 is an automated dispute resolution process that may be initiated by a buyer in response to not receiving an item (e.g., good or service) for a significant time after the buyer and seller have completed a transaction.

The item received not as described component process 208 is an automated dispute resolution process that may be initiated by a buyer complainant in response to receiving an item not as described in the listing. Similarly, the item received significantly not as described component process 210 is an automated dispute resolution processes that may be initiated by a buyer in response to receiving an item significantly not as described in the listing.

The return policy dispute component process 212 is an automated dispute resolution process that may be initiated by a buyer complainant in response to a seller that violates their own published return policy (e.g., a seller advertises a 30 day money back guarantee but later declines the accept a return of an item during this time frame).

Seller or Buyer Initiated Complaints

The solution matching component process 214 is an automated dispute resolution process that may be initiated by a seller or buyer complainant to resolve a dispute. The solution matching component process 214 suggests solutions that may be implemented responsive to the consent of the complainant and respondent. For example, a buyer complainant and a seller respondent may agree to immediately settle a dispute regarding a damaged item by the seller refunding the purchase price and the buyer returning the item. In other words the solution matching component process 214 may ensure that the obvious and straightforward solutions to the dispute have been explored. The solution matching component process 214 may present multiple solutions to the complainant who may elect one or more of the proposed solutions. The respondent may agree to any one of the proposed solutions to settle the dispute.

The monetary settlement component process 216 is an automated dispute resolution process that may be initiated by a buyer or a seller complainant to settle a dispute for money (e.g., the Cybersettle application developed by Cybersettle, of White Plains, N.Y.). In an example embodiment, the complainant and respondent may enter offers and demands that are received by the monetary settlement component process 216. The party seeking money in exchange for settlement of the dispute typically enters three demands (e.g., monetary amount) that decrease in value. The party paying money in exchange for settlement of the dispute typically enters three offers that increase in value. The monetary settlement component process 216 automatically compares the offers and demands round by round. If the offer and demand associated with a round are within a published range of settlement then the dispute settles. Otherwise the monetary settlement component process 216 proceeds to the next round. If all of the offers and demands are not within a range of settlement, then the monetary settlement component process 216 keeps the offer and demand amounts confidential, allowing the participants to utilize another component process 192 to settle the dispute without having prejudiced their positions.

The mediation component process 218 may be a fully automated dispute resolution process that may be initiated by a buyer or seller complainant to settle a dispute with mediation services. The mediation component process 218 may be utilized to resolve any number of different types of disputes and uses a mediator that interacts with the disputants (e.g., email, videoconference, instant messaging, etc., combinations thereof) to resolve the dispute. The mediator may be a human being or an automated process. The mediator seeks to elicit from the disputants a mutually acceptable resolution to the dispute but has no power to impose a resolution on the parties.

The non-binding arbitration component process 220 may be a fully automated dispute resolution process that may be utilized by a buyer or seller complainant to settle a dispute with arbitration services. The non-binding arbitration component process 220 uses an arbitrator that interacts with the disputants to settle the dispute. The arbitrator may be a human being or an automated process. The arbitrator interacts with the disputants (e.g., email, videoconference, instant messaging, etc., combinations thereof) who present their respective cases including arguments, documents, testimony, and other persuasive evidence. The arbitrator deliberates on the proffered evidence and arguments to render a non-binding decision on the parties. In other words the complainant and respondent are not obliged to follow the decision of the arbitrator.

The arbitration component process 222 may be a fully automated dispute resolution process that may be initiated by a buyer or seller complainant to resolve a dispute with arbitration services. The arbitration component process 222 may execute in the same manner as the non-binding arbitration component process 220; however, the arbitrator may render a binding decision on the complainant and respondent.

The feedback review component process 224 may be a fully automated dispute resolution process that may be initiated by a buyer or seller complainant to request an independent third party to review of feedback. The independent third party may be a human being or an automated process. The complainant may initiate the request because the complainant believes that the feedback is unfair or unwarranted and wants to protect their reputation. In an example embodiment, a feedback score may be removed based on the decision of the third party. In another embodiment, the feedback score and comment may be removed.

The mutual feedback withdrawal component process 226 may be a fully automated dispute resolution process that may be initiated by a buyer or seller complainant to remove mutual feedback (e.g., complainant authored feedback on the respondent and respondent authored feedback on the complainant). In an example embodiment, a feedback score may be withdrawn (e.g., not available for public inspection) based on consent of the complainant and respondent. In another embodiment, the feedback score and comment may be withdrawn.

The escrow related disputes component process 228 is an automated dispute resolution process that may be initiated by a buyer or seller complainant to resolve a dispute involving the use of an escrow service. An escrow service may be a licensed and regulated company that collects, holds, and sends a buyer's money to a seller according to instructions agreed on by both the buyer and seller. For example, the buyer may receive and approve the item from the seller within an agreed time frame and the escrow service may then send the payment to the seller.

The expert evaluation component process 230 is an automated dispute resolution process that may be initiated by a buyer or seller complainant to resolve a dispute with the aid of a third party who provides their personal, expert opinion as to a fair outcome to the dispute. The negotiation component process 232 is an automated dispute resolution process that may be utilized by a buyer or seller complainant to facilitate an exchange of messages between the parties with the intent of settling a dispute between them. The dispute aggregation process 234 provides a unified interface that aggregates the disputes, relating to a common entity, from two or more payment processing systems.

Aggregating Disputes from Two or More Payment Processing Systems

Figure 10:
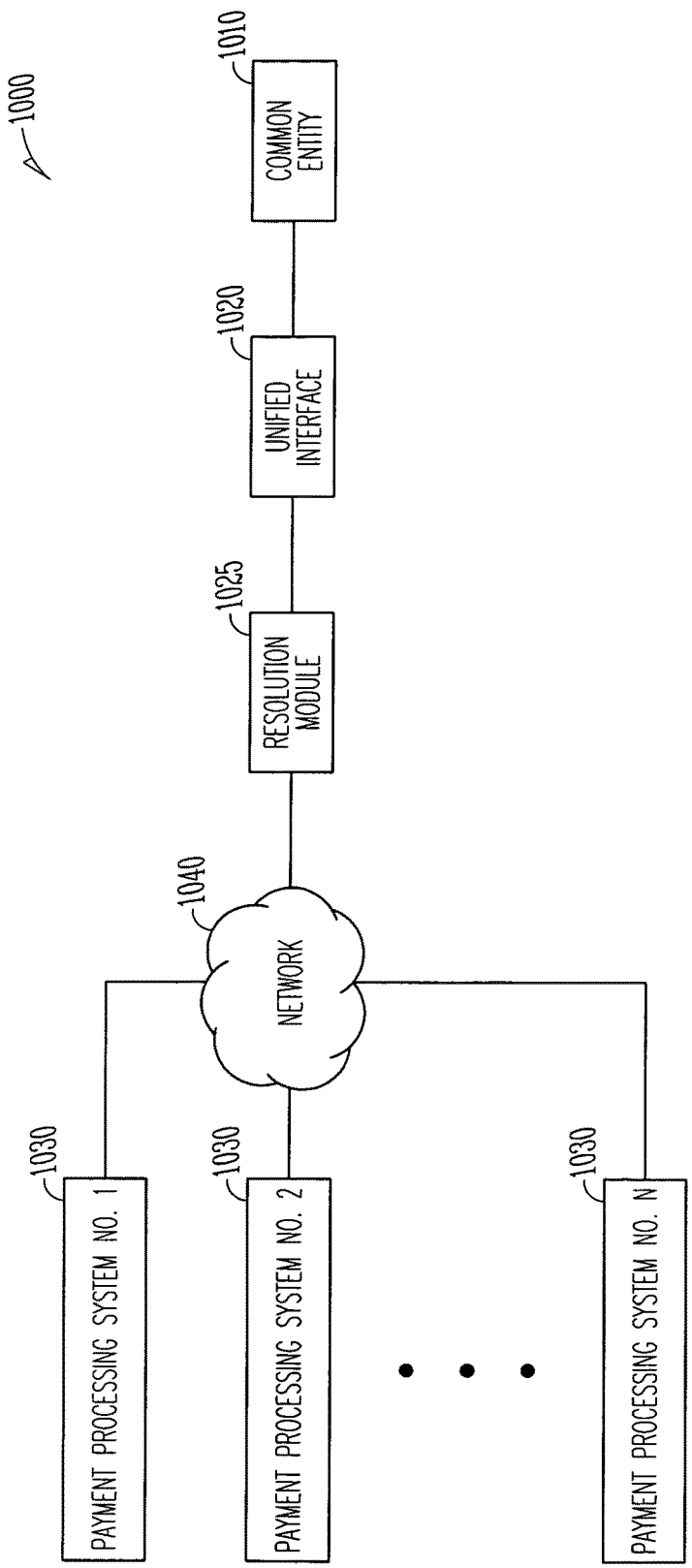
FIG. 10 is a block diagram illustrating a dispute resolution system, according to an example embodiment.

FIG. 10 is a block diagram of an example embodiment of a system 1000 to aggregate information relating to disputes from two or more payment processing systems. The system 1000 may be one of the component processes 192 of FIG. 8, as either part of the workflow engine 178 of the dispute resolution applications, or associated with a third party server 40.

The system 1000 of the example embodiment of FIG. 10 includes a resolution module 1025. The resolution module 1025 has associated with it a unified interface 1020. The resolution module 1025 is coupled to a plurality of payment processing systems 1030 through a network 1040. In one embodiment, the network 1040 is the Internet. In an embodiment, these payment processing systems 1030 may be a credit card or charge card processor such as Visa, Mastercard, Discover, and/or American Express. The payment processing systems may also be a third party, such as a merchant bank, that handles the processing of the credit or charge card for Visa, Mastercard, Discover, and/or American Express. The payment processing system 1030 may further be a web-based processing system that handles the payments of transactions in an electronic marketplace and/or for a web-based commerce site. An example of such a web-based processing system is PayPal®. FIG. 10 further illustrates that a common entity 1010 may have access to the resolution module 1025 via the unified interface 1020. Examples of common entities that may have access to the resolution module 1020 include an individual seller in an electronic marketplace, a seller with its own commercial website, a buyer in an electronic marketplace, a customer of a commercial website, a payment processing system, and an operator of the resolution module, just to name a few.

In an embodiment, the system 1000 of FIG. 10 is configured such that the resolution module receives information about a plurality of disputes relating to transactions involving a common entity such as a buyer, seller, operator, etc. The information regarding these disputes received by the resolution module 1025 originate from any one of a number of payment processing systems 1030. The payment processing system 1030 that handles a particular transaction depends on several factors including the type of credit card used in the transaction and the merchant bank associated with a commercial entity involved in the transaction. For example, for a web-based commercial site, a buyer may use one of several types of credit cards, and the owner of the web-based commercial site may have a separate merchant bank for each of those different types of credit cards. Moreover, a seller may have several different web sites offering for sale many different products. Each one of these web sites may have a different payment processing system for each different credit card or other means of payment. Therefore, when disputes arise relating to the many transactions associated with a common entity in a network-based commerce system, these disputes may be associated with a plurality of payment processing systems. To resolve these disputes, the seller, owner of a website, or other common entity has to work with each and every payment processing system to resolve these disputes. This is a very time consuming process for a merchant.

In an embodiment, the unified interface 1020 is configured to provide information relating to the disputes that are associated with the plurality of payment processing systems 1030. This information is provided to an owner of a web-based commercial site or other seller in a network-based commerce system. In another embodiment, this information is provided to a customer of a web-based commercial site or buyer in a network-based commerce system. In yet another embodiment, a third party operator of the resolution module 1025 has access to this information. The information provided to a customer or buyer may be limited to information relating to the customer or buyer's own transactions. In an embodiment, this information can be handled by the system by determining from the user table in FIG. 6, the transactions that are associated with a user. The transaction numbers from the user table can then be used to key into the dispute resolution table (FIG. 4). In a particular embodiment, a customer or buyer has access to the information relating to the dispute if the customer or buyer has a user account (FIG. 6, No. 154) or other association with the resolution module. Whether the customer or buyer has a user account or other association with the resolution module may be determined by the resolution module.

As disclosed above, these disputes may relate to a chargeback of a transaction in the network-based commerce system. Chargebacks may be caused by one or more of several factors, including, but not limited to the factors addressed by some of the modules in FIG. 9, for example, the item was not received (204) or the item received was not as described (208).

The resolution module 1025 may be configured to provide to the common entity, through the unified interface 1020, an ability to resolve a dispute. This ability to resolve the dispute may be invoked by any of the common entities involved in the transaction such as the buyer or the seller. In an embodiment, if the common entity indicates through the unified interface 1020 that it would like to resolve one or more disputes, the common entity is presented a user interface 1200A as that illustrated in FIG. 12A. The interface 1200A illustrates a list of disputed open chargebacks. The information provided by the interface includes the chargeback details 1210A, the payment date of the disputed transaction 1220A, the payment processing system 1230A that processed the disputed transaction, and a resolve field 1240A that contains a button at which the common entity can indicate that it would like to select the associated disputed transaction to resolve.

Figure 11:
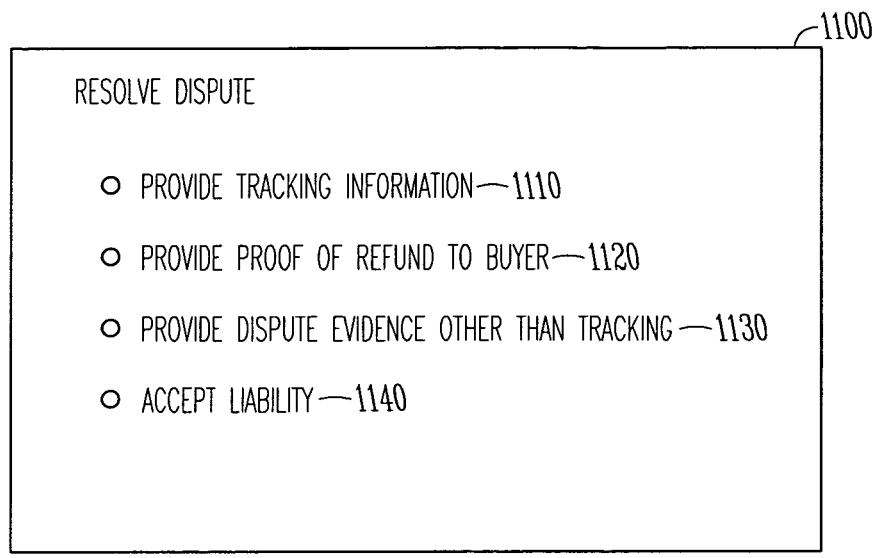
FIG. 11 is a user interface for a dispute resolution system, according to an example embodiment.

When the common entity selects a disputed transaction to resolve, the dispute resolution module 1025 displays on the unified interface 1020 an interface 1100 such as illustrated in FIG. 11. In the example of FIG. 11, the common entity is given the choice of four options to resolve the dispute. At 1110, the common entity can provide tracking information. This would include any information that proves that a seller sent the ordered goods or provided the ordered services to the buyer. At 1120, the common entity can provide evidence that the common entity refunded the buyer's purchase price. At 1130, the common entity can provide evidence other than tracking information which will help to resolve the dispute. At 1140, the common entity can choose to accept liability for the disputed transaction, which results in the funds being returned to the buyer.

In an embodiment, the resolution module 1025 may also display on the unified interface 1020 information relating to all of the resolved (closed) chargebacks. An example of such an interface 1200B is illustrated in FIG. 12B. The interface 1200B includes the chargeback details 1210B, the payment date 1220B of the transaction, the payment processing system 1230B that handled the transaction, and the outcome 1240B of the resolved dispute. For example, referring to FIG. 12B, transaction 1250B was automatically refunded to the buyer. So, in this instance, the merchant created a rule which caused this dispute to be handled automatically. Transaction 1255B remains disputed, so this dispute will then continue to work its way through the proper dispute channels. Transaction 1260B has been refunded to the buyer, and for transaction 1265B, the seller has accepted liability and the outcome will be changed to refunded when the funds are credited to the buyer.

Figure 13:
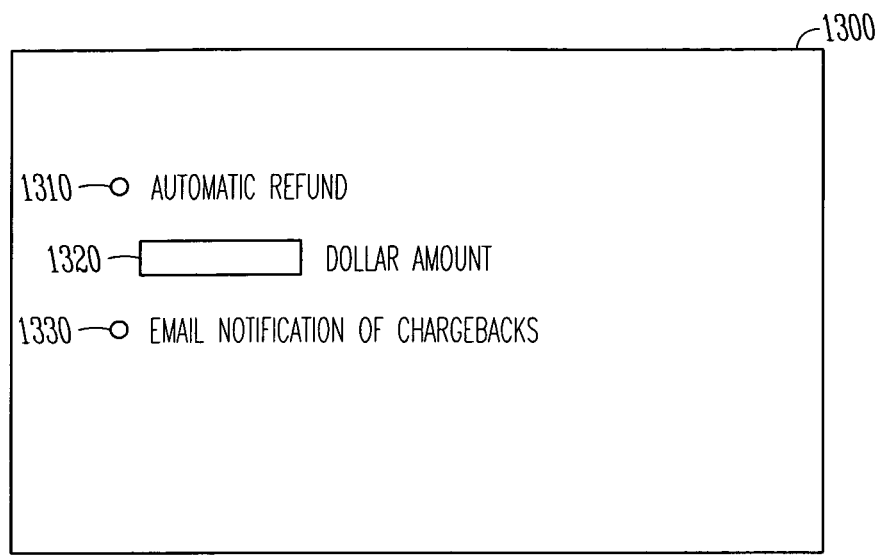
FIG. 13 is a user interface permitting a common entity to create dispute resolution rules, according to an example embodiment.

In one example, the dispute resolution module permits the common entity to create dispute resolution rules. These rules may require participation by the parties of the transaction, and/or the rules may resolve certain disputes automatically without further participation by any party. FIG. 13 illustrates an example interface 1300 from which a user can create dispute resolution rules. For example, by selecting checkbox 1310 in FIG. 13, a seller or other merchant may create a rule that any chargeback whose amount is less than a certain dollar amount is to be automatically approved. If this checkbox is selected, the common entity also enters into the text field 1320 the threshold dollar amount under which a disputed transaction will be automatically refunded without any input needed on the part of the commercial entity. Such a rule cuts back on the number of disputes to which a seller must devote time, thereby saving the seller time and other resources. As another example, a seller may select the check box 1330 to set up the resolution module to automatically notify the seller via an email or other electronic communication when a chargeback is recorded against a prior transaction of the seller. One advantage of this set up is that a seller is notified in a real time manner of chargebacks. The seller can then address the chargebacks in a timely manner, and the chargebacks do not accumulate and are not reported to the seller only on a periodic basis.

Figure 14:
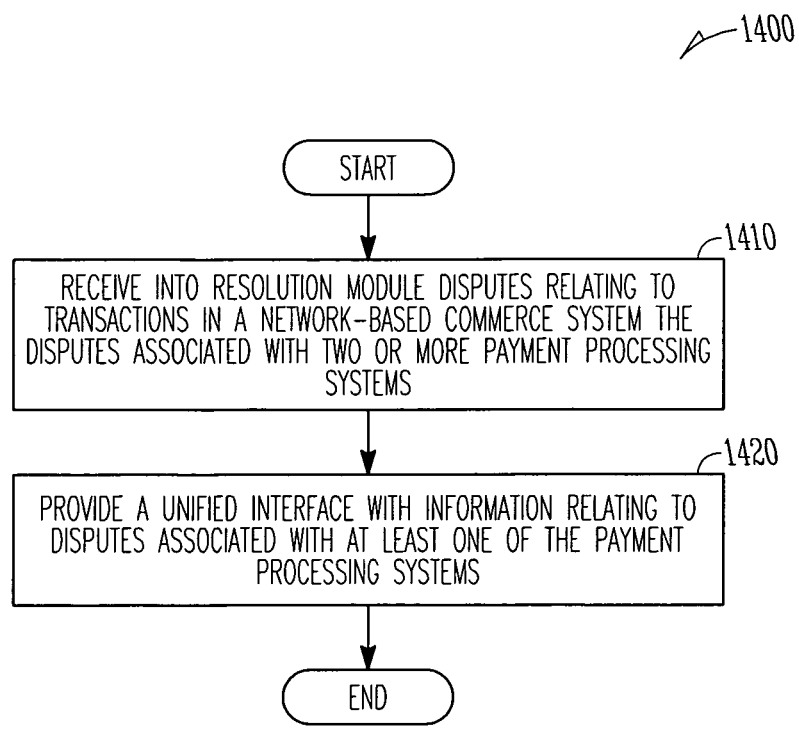
FIG. 14 is a flowchart illustrating a process to aggregate disputes from two or more payment processing systems, according to an example embodiment.

FIG. 14 illustrates an example embodiment of a process 1400 for aggregating disputes involving a common entity, and that are associated with a plurality of payment processing systems. The process 1400, at operation 1410, receives into a resolution module 1025 a plurality of disputes relating to transactions involving a common entity. The plurality of disputes at 1410 are associated with two or more payment processing systems 1030. At operation 1420, information is provided, in the unified interface 1020, relating to disputes that are associated with at least one of the two or more payment processing systems 1030. Information may be provided that is associated with several of the payment processing systems, and information may be provided that relates to all of the payment processing systems with which a merchant or other common entity has transactions.

Figure 15:
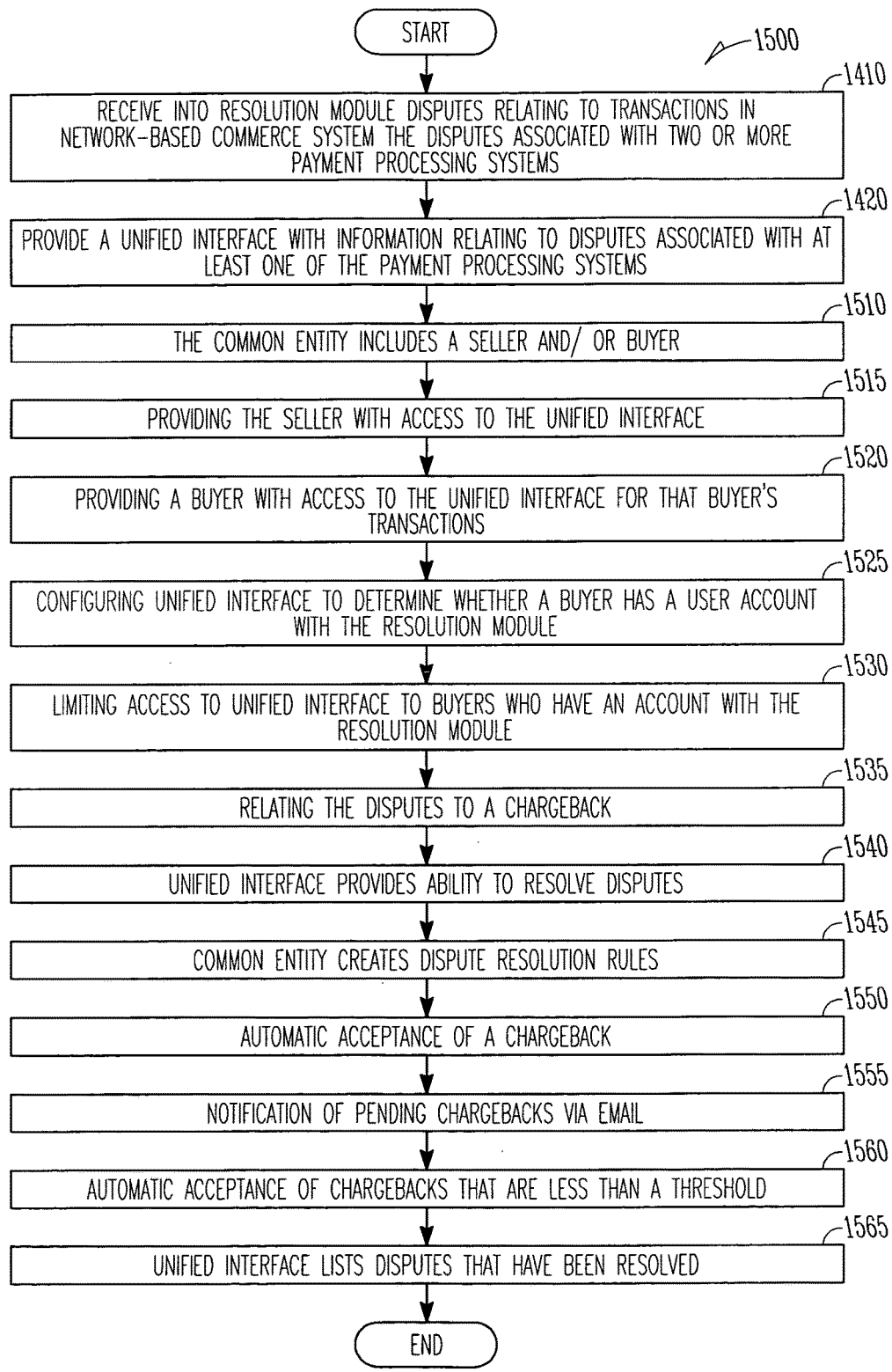
FIG. 15 is a flowchart illustrating another process to aggregate disputes from two or more payment processing systems, according to an example embodiment.

FIG. 15 illustrates another example embodiment of a process 1500 for aggregating disputes involving a common entity and that are associated with a plurality of payment processing systems 1030. The process 1500 includes the steps 1410 and 1420 from the process 1400 of FIG. 14, and includes several additional operations. At 1510, the common entity of operation 1410 includes a seller and/or a buyer. At operation 1515, information relating to the disputes that are associated with at least one of the plurality of payment processing systems is provided to a seller via the unified interface, and at operation 1520, information relating to the disputes that are associated with at least one of the plurality of payment processing systems are provided to a buyer. The information provided to such a buyer relates only to the buyer's own transactions.

At operation 1525, the unified interface is configured to determine whether a buyer has a user account with the resolution module. Then, at operation 1530, the unified interface provides the buyer access to the unified interface based on the user having a user account. At operation 1535, the disputes that are associated with at least one of the two or more payment processing systems relate to a chargeback.

At operation 1540, the unified interface provides to the common entity an ability to resolve the disputes associated with at least one of the two or more payment processing systems. At 1545, the dispute resolution module provides the ability to the common entity to resolve the disputes associated with at least one of the two or more payment processing systems by permitting the common entity to create dispute resolution rules. At 1550, the dispute resolution rules may include the ability to automatically accept a chargeback. A common entity may also configure, at 1555, the dispute resolution module to send a notification of a pending chargeback via an electronic communication. At 1560, the automatic acceptance of a chargeback relates to an approval of chargebacks that comprise an amount less than a threshold. At 1565, the unified interface provides to the common entity information relating to disputes that have been resolved.

Figure 16:
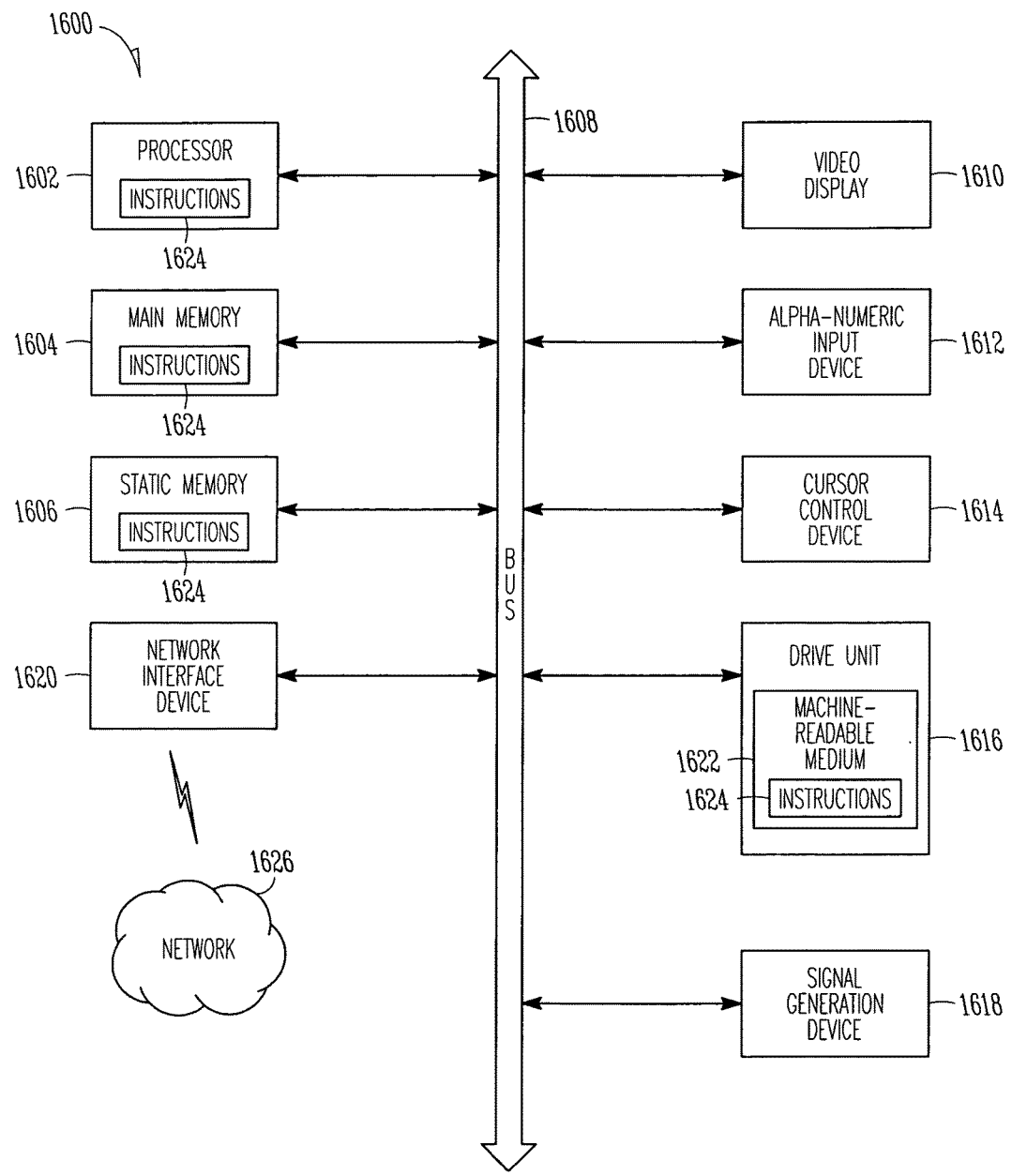
FIG. 16 is a block diagram of a machine, according to an example embodiment, including instructions to perform any one or more of the methodologies described herein.

FIG. 16 shows a diagrammatic representation of machine in the exemplary form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1600 includes a processor 1602 (e.g., a central processing unit (CPU) a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620.

While the machine-readable medium 1622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

In the foregoing detailed description, various features are grouped together in one or more examples or examples for the purpose of streamlining the disclosure. This method of disclosure is not to be interpreted as reflecting an intention that the claimed examples of the invention require more features than are expressly recited in each claim. Rather, as the following claims reflect, inventive subject matter lies in less than all features of a single disclosed example. Thus the following claims are hereby incorporated into the detailed description of examples of the invention, with each claim standing on its own as a separate example. It is understood that the above description is intended to be illustrative, and not restrictive. It is intended to cover all alternatives, modifications and equivalents as may be included within the scope of the invention as defined in the appended claims. Many other examples will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," " "second," and "third," etc., are used merely as labels, and are not intended to impose numerical requirements on their objects.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The invention claimed is:

1. A method implemented via modules including instructions on a non-transitory machine readable medium, the method comprising:
   receiving a first notification of a first dispute from a first payment processing system, the first dispute opened by a first customer via the first payment processing system, the first dispute concerning a transaction between the first customer and a common entity;
   receiving a second notification of a second dispute from a second payment processing system, the second dispute opened by a second customer via the second payment processing system, the second dispute concerning a transaction between the second customer and the common entity;

presenting information about the first dispute and information about the second dispute in a unified user interface of a network-based commerce system;

providing in the unified user interface a resolve field including a first button associated with the information about the first dispute and a second button associated with the information about the second dispute, wherein a first selection of the first button by the common entity enables a first resolution of the first dispute and a second selection of the second button associated by the common entity enables a second resolution of the second dispute such that the first dispute and the second dispute are able to be addressed by the common entity via the unified user interface;

receiving the first selection of the first button associated with the information of the first dispute;

responsive to the first selection, presenting a second interface having at least one option to resolve the first dispute; and responsive to selection of the at least one option, resolving the first dispute via the unified user interface without the common entity working individually with either of the first payment processing system, wherein each of the first payment processing system and the second payment processing system is at least one of a credit card or charge card processor, a merchant bank that handles processing of a credit card or charge card, and a web-based processing system that handles payments of transactions related to a web-based commerce site.

2. The method of claim 1, wherein the common entity includes one or more of a seller and a buyer.

3. The method of claim 1, further comprising:
determining whether the common entity has a user account; and
selectively providing the common entity access to the unified interface based on that determination.

4. The method of claim 1, wherein at least one of the first dispute and the second dispute relates to a chargeback.

5. The method of claim 1, further comprising receiving a dispute resolution rule from the common entity, wherein the resolving of the at least one of the first dispute and the second dispute is based on the dispute resolution rule.

6. The method of claim 5, wherein:
the dispute resolution rule includes a condition under which a chargeback is automatically accepted; and
the method further comprises automatically notifying the common entity of the chargeback via an electronic communication.

7. The method of claim 6, wherein the condition is that the chargeback comprises an amount less than a threshold.

8. The method of claim 1, wherein further comprising providing via the unified user interface information to the common entity relating to a dispute that has been resolved.

9. A system comprising:
a memory having instructions having stored thereon;
one or more processors communicatively coupled to the memory, the one or more processors configured to execute the instructions to cause the system to perform operations comprising:
receiving a first notification of a first dispute from a first payment processing system, the first dispute opened by a first customer via the first payment processing system, the first dispute concerning a transaction between the first customer and a common entity;

receiving a second notification of a second dispute from a second payment processing system, the second dispute opened by a second customer via the second payment processing system, the second dispute concerning a transaction between the second customer and the common entity;

presenting information about the first dispute and information about the second dispute in a unified user interface of a network-based commerce system;

providing in the unified user interface a resolve field including a first button associated with the information about the first dispute and a second button associated with the information about the second dispute, wherein a first selection of the first button by the common entity enables a first resolution of the first dispute and a second selection of the second button associated by the common entity enables a second resolution of the second dispute such that the first dispute and the second dispute are able to be addressed by the common entity via the unified user interface;

receiving the first selection of the first button associated with the information of the first dispute;

responsive to the first selection, presenting a second interface having at least one option to resolve the first dispute; and responsive to selection of the at least one option, resolving the first dispute via the unified user interface without the common entity working individually with either of the first payment processing system;

wherein each of the first payment processing system and the second payment processing system is at least one of:
a credit card or charge card processor,
a merchant bank that handles processing of a credit card or charge card, and
a web-based processing system that handles payments of transactions related to a web-based commerce site.

10. The system of claim 9, wherein the common entity includes one or more of a buyer and a seller.

11. The system of claim 9, wherein the operations further comprise:
determining whether the common entity has a user account with the resolution module, and
selectively providing the common entity access to the unified interface based on that determination.

12. The system of claim 9, wherein at least one of the first dispute and the second dispute relates to a chargeback.

13. The system of claim 9, wherein:
the operations further comprise receiving a dispute resolution rule from the common entity; and
the resolving of the at least one of the first dispute and the second dispute is based on the dispute resolution rule.

14. The system of claim 13, wherein:
the dispute resolution rule includes a condition under which a chargeback is automatically accepted; and
the operations further comprise automatically notifying the common entity of the chargeback via an electronic communication.

15. The system of claim 14, wherein the condition is that the chargeback comprises an amount less than a threshold.

16. The system of claim 9, wherein the operations further comprise providing via the unified user interface information to the common entity relating to a dispute that is resolved.

17. A tangible non-transitory machine readable medium storing a set of instructions that, when executed by a machine, cause the machine to perform operations comprising:
- receiving a first notification of a first dispute from a first payment processing system, the first dispute opened by a first customer via the first payment processing system, the first dispute concerning a transaction between the first customer and a common entity;
- receiving a second notification of a second dispute from a second payment processing system, the second dispute opened by a second customer via the second payment processing system, the second dispute concerning a transaction between the second customer and the common entity;
- presenting information about the first dispute and information about the second dispute in a unified user interface of a network-based commerce system;
- providing in the unified user interface a resolve field including a first button associated with the information about the first dispute and a second button associated with the information about the second dispute, wherein a first selection of the first button by the common entity enables a first resolution of the first dispute and a second selection of the second button associated by the common entity enables a second resolution of the second dispute such that the first dispute and the second dispute are able to be addressed by the common entity via the unified user interface;
- receiving the first selection of the first button associated with the information of the first dispute;
- responsive to the first selection, presenting a second interface having at least one option to resolve the first dispute; and
- responsive to selection of the at least one option, resolving the first dispute via the unified user interface without the common entity working individually with either of the first payment processing system, wherein each of the first payment processing system and the second payment processing system is at least one of a credit card or charge card processor, a merchant bank that handles processing of a credit card or charge card, and a web-based processing system that handles payments of transactions related to a web-based commerce site.

18. The non-transitory machine readable medium of claim 17, wherein the common entity includes one or more of a seller and a buyer.

19. The non-transitory machine readable medium of claim 17, wherein the operations further comprise:
- determining whether the common entity has a user account with the resolution module; and
- selectively providing the common entity access to the unified interface based on that determination.

20. The non-transitory machine readable medium of claim 17, wherein at least one of the first dispute and the second dispute relates to a chargeback.

21. The non-transitory machine readable medium of claim 17, the wherein the operations further comprise receiving a dispute resolution rule from the common entity.

22. The non-transitory machine readable medium of claim 21, wherein:
- the dispute resolution rule includes a condition, under which a chargeback is automatically accepted; and
- the operations further comprise notifying the common entity of the chargeback via an electronic communication.

23. The non-transitory machine readable medium of claim 22, wherein the condition is that the chargeback comprises an amount less than a threshold.

24. The non-transitory machine readable medium of claim 17, wherein the operations further comprise providing via the unified user interface the common entity information relating to a dispute that has been resolved.

* * * * *